(12) United States Patent
McCrary

(10) Patent No.: US 7,988,580 B2
(45) Date of Patent: Aug. 2, 2011

(54) CONTINUOUSLY VARIABLE TRANSMISSION

(75) Inventor: Paul Thomas McCrary, Belleville, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 982 days.

(21) Appl. No.: 11/895,675

(22) Filed: Aug. 27, 2007

(65) Prior Publication Data
US 2008/0064555 A1    Mar. 13, 2008

Related U.S. Application Data

(60) Provisional application No. 60/842,749, filed on Sep. 7, 2006.

(51) Int. Cl.
F16H 47/04    (2006.01)
F16H 57/08    (2006.01)
(52) U.S. Cl. .......................... 475/72; 475/339
(58) Field of Classification Search .................. 475/72, 475/73, 83, 330, 338, 339, 903
See application file for complete search history.

(56) References Cited

U.S. PATENT DOCUMENTS

| | | | |
|---|---|---|---|
| 3,988,949 A | 11/1976 | Weseloh et al. | |
| 4,641,552 A | 2/1987 | Kurywczak | |
| 5,269,732 A | 12/1993 | Weiss et al. | |
| 5,496,223 A | 3/1996 | Jarchow | |
| 5,893,814 A | 4/1999 | Kiyosawa | |
| 5,916,053 A | 6/1999 | McCarrick et al. | |
| 5,919,111 A | 7/1999 | Park | |
| 5,931,760 A | 8/1999 | Beim et al. | |
| 5,947,858 A | 9/1999 | Williams | |
| 5,993,347 A | 11/1999 | Park | |
| 6,450,912 B2 * | 9/2002 | Todeschini | 475/72 |
| 6,530,855 B1 | 3/2003 | Folsom et al. | |
| 6,761,658 B1 * | 7/2004 | Stettler, Jr. | 475/73 |
| 6,997,838 B2 | 2/2006 | Folsom et al. | |
| 7,241,242 B2 * | 7/2007 | Schmidt | 475/72 |
| 7,354,368 B2 * | 4/2008 | Pollman | 475/72 |
| 2003/0166430 A1 | 9/2003 | Folsom et al. | |
| 2005/0059521 A1 * | 3/2005 | Funato et al. | 475/73 |
| 2006/0217225 A1 * | 9/2006 | Hiraki et al. | 475/72 |
| 2007/0004547 A1 * | 1/2007 | Ripamonti et al. | 475/72 |
| 2007/0105680 A1 * | 5/2007 | Ulbrich | 475/72 |

FOREIGN PATENT DOCUMENTS

DE    29 02 893 A1    7/1980

OTHER PUBLICATIONS

English translation of DE2902893A, http://translationgateway.epo.org, Nov. 17, 2010.*

* cited by examiner

*Primary Examiner* — Roger Pang
(74) *Attorney, Agent, or Firm* — Warn Partners, P.C.

(57) ABSTRACT

A continuously variable transmission that is highly suitable for use in a large car or light truck vehicle is provided.

1 Claim, 8 Drawing Sheets

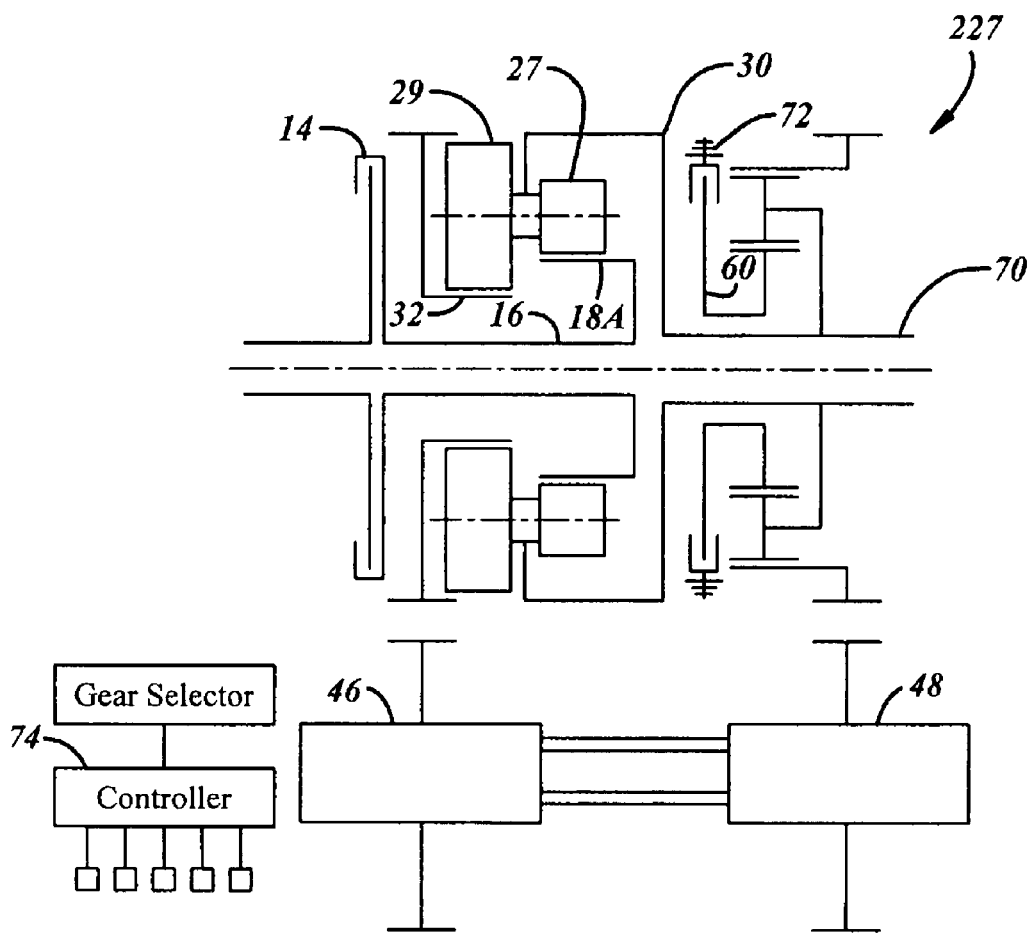
FIG. 14
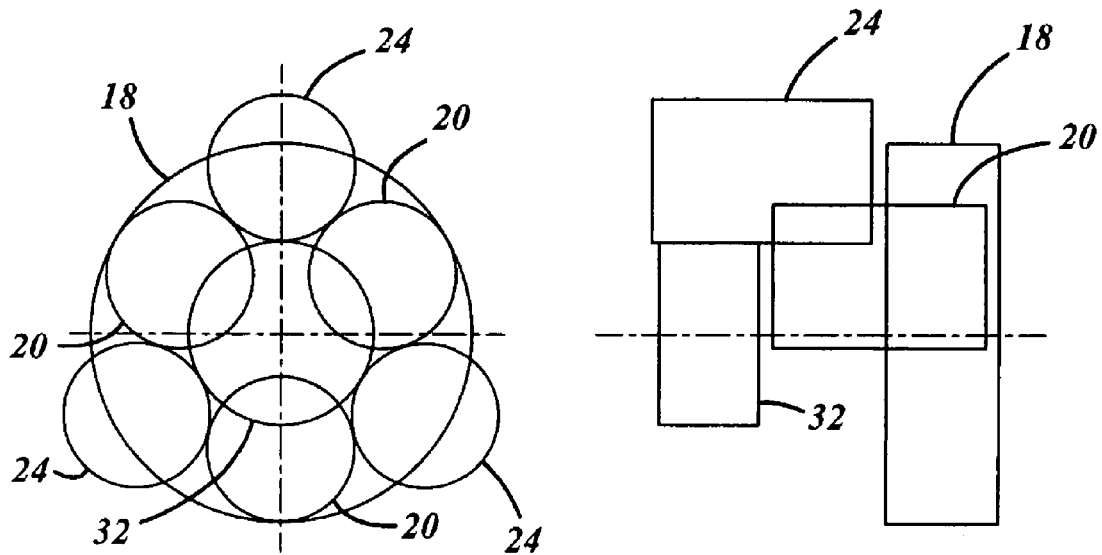
FIG. 1B   FIG. 1C

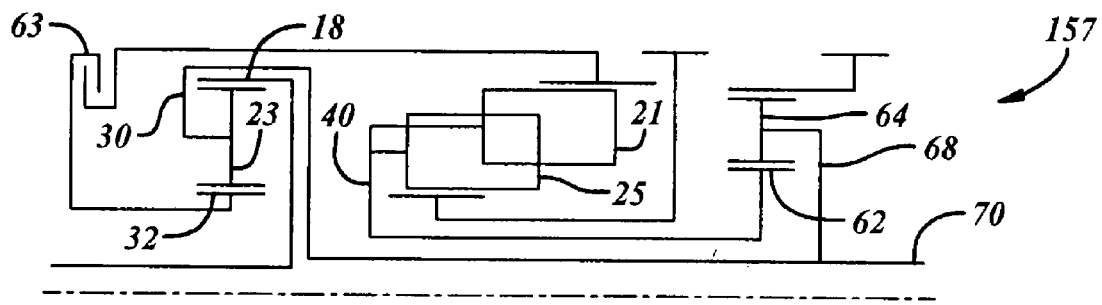
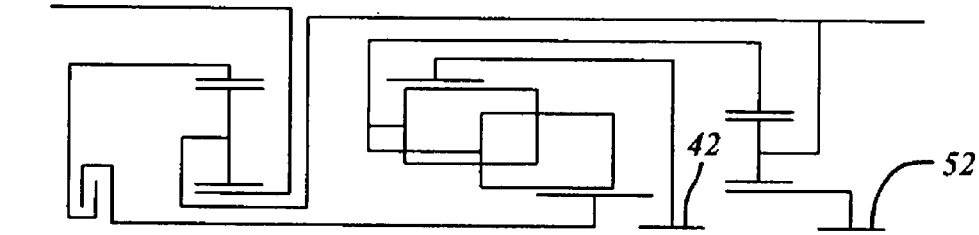
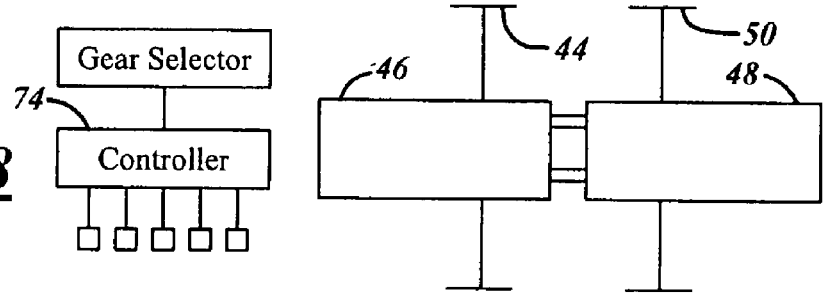
FIG. 8
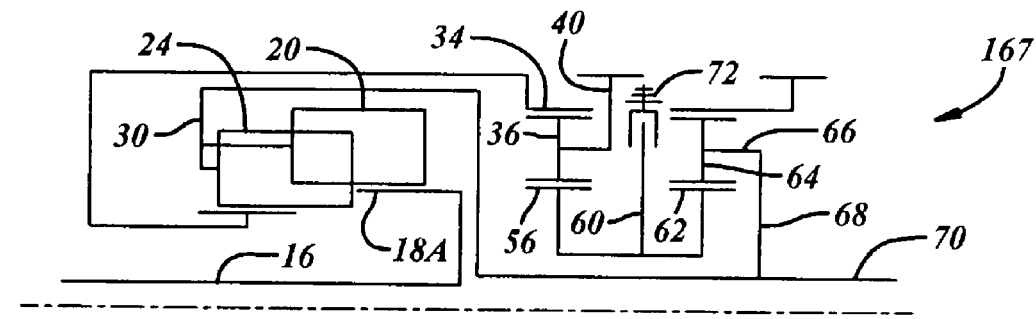
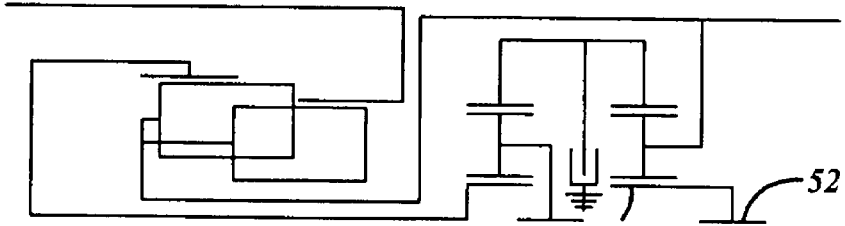
FIG. 9
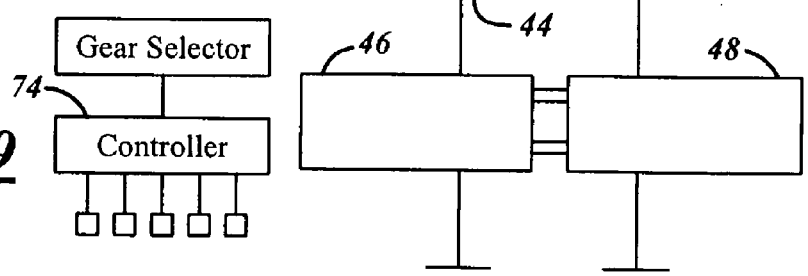

CONTINUOUSLY VARIABLE TRANSMISSION

CROSS-REFERENCE TO RELATED APPLICATIONS

This application claims the benefit of U.S. Provisional Application No. 60/842,749, filed Sep. 7, 2006.

FIELD OF THE INVENTION

The present invention relates to continuously variable transmissions, especially continuously variable transmissions used in large car and light truck vehicles.

BACKGROUND OF THE INVENTION

Continuously variable transmissions can be found in a review of U.S. Pat. Nos. 6,997,838, 6,530,855 and U.S. Patent Publication No. 2003/0166430.

SUMMARY OF THE INVENTION

The present invention provides a continuously variable transmission that is highly suitable for use in a large car or light truck vehicle that is an alternative to the continuously variable transmissions cited above. In one embodiment, the transmission includes an input shaft torsionally associated with a carrier, the carrier having at least first and second sets of pinion gears rotatably mounted thereon. A fluid pump is also provided that is torsionally associated via a gear train with the first and second pinion gears. A fluid motor powered by the pump is provided. An output shaft is torsionally associated with the motor and independently torsionally associated with the carrier is also included.

BRIEF DESCRIPTION OF THE DRAWINGS

FIG. 1B is a partial schematic front view of the transmission shown in FIG. 1A;

FIG. 1C is a partial schematic side view of the transmission shown in FIG. 1A;

FIG. 8 is a schematic view of an alternate embodiment of the present invention;

FIG. 9 is a schematic view of an alternate embodiment of the present invention;

FIG. 14 is a schematic view of an alternate embodiment of the present invention.

DETAILED DESCRIPTION OF THE INVENTION

Figure 1A:
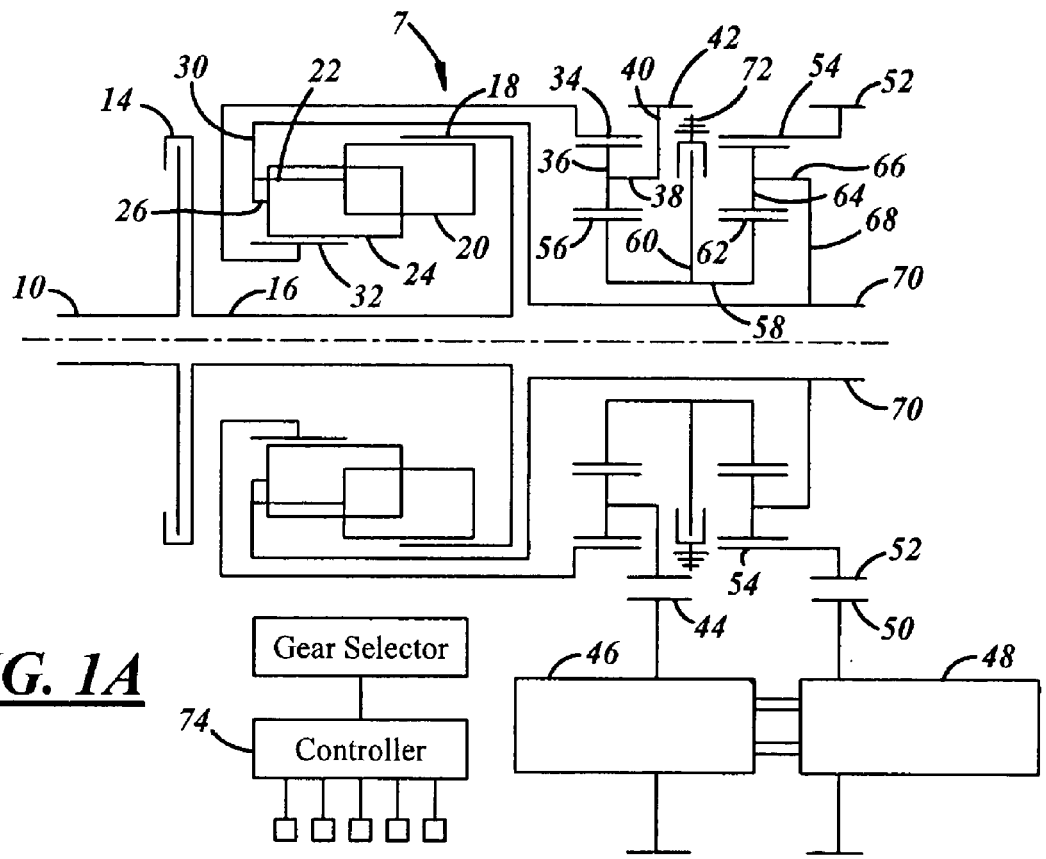
FIG. 1A is a schematic view of an embodiment of the present invention.

Referring to FIGS. 1A-1C, transmission 7 of the present invention has an input shaft 10 connected with the output of a power source such as an engine or motor. The input shaft 10 is connected with a clutch 14. The clutch 14 is connected with an intermediate shaft 16. The shaft 16 is connected with a front or first ring gear 18. The ring gear 18 has internal teeth mating with a first pinion gear set 20. The pinion gears 20 rotate on shafts 22. The pinion gears 20 are additionally in mesh with a second pinion gear set 24. The pinion gears 24 rotate on shafts 26. Pinion gears 24 are positioned radially outward from pinion gears 20 (see FIG. 1B). Shafts 22 and 26 are connected on a common front or first carrier 30. The pinion gears 20, 24 and the carrier 30 form a torque distributor that is torsionally associated with the input and output shafts 16, 70 and with a pump 46 in a manner to be described later. The pinion gears 24 are in mesh with a sun gear 32. The sun gear 32 is fixed with a ring gear 34. The ring gear 34 meshes with the pinion gear set 36. Pinions 36 rotate about shafts 38. The shafts 38 are connected with a second carrier 40. The second carrier 40 is connected with a chain sprocket 42. The chain sprocket 42 is torsionally connected via a chain (not shown) with the chain sprocket 44.

Sprocket 44 is connected with the fluid pump 46. The sun gear 32, ring gear 34, pinion gear 36, carrier 38 and sprockets 42, 44 create a gear chain that connects the torque distribution with the pump 46. In an alternate embodiment, the carrier 40 can be torsionally connected by meshing gears with the pump 46. A motor 48 is connected with a sprocket 50. The pump 46 is a variable positive displacement hydrostatic pump. The pump 46 is fluidly connected with the variable positive displacement hydrostatic motor 48. The sprocket 50 via a chain (not shown) is connected with a sprocket 52. The sprocket 52 is fixably connected with a ring gear 54. In an alternate embodiment, the motor 48 can be torsionally connected by meshing gears with the ring gear 54.

Pinions 36 mesh with a middle or second sun gear 56. The sun gear 56 is connected with a shaft 58 that is fixed with a clutch plate 60 and third sun gear 62. The sun gear 62 meshes with a fourth pinion gear set 64. The pinion gears 64 additionally mesh with the ring gear 54. The pinion gears 64 rotate about shafts 66. The shafts 66 are fixed with a rear or third carrier 68. The first carrier 30 and the third carrier 68 are fixed with the output shaft 70. A selectively engageable clutch brake 72 is provided to optionally ground the sun gears 56 and 62 via the clutch plate 60.

A controller 74 controls the operation of transmission 7. Controller 74 can be a separate controller, a portion of the engine controller, or a confederation of different controllers within the vehicle. Controller 74 is cognizant of the selected gear by a gear selector, engine throttle position, engine speed, output speed of the transmission, and various operational parameters of a hydraulic pump 46, and the hydraulic motor 48.

In operation, input torque from an engine or other power source is delivered to the ring gear 18 and is then divided into two paths by the torque distributor. The first path is to the carrier 30 and the output shaft 70. The second path is to the sun gear 32 to the pump 46, motor 48 and then to the output shaft 70. The displacement of the pump 46 and the motor 48 are variable. The controller, by setting pump and motor displacements, defines a displacement ratio. Due to incompressible nature of hydraulics, the displacement ratio pump/motor determines the speed ratio of the pump/motor. The controller thereby affects the speeds of each torque path (sun gear 32 and carrier 30/output shaft 70), and sets the overall transmission ratio and power split.

In the example shown in FIG. 1C, the torque distributor ring gear 18 radius is 82 mm. The sun gear 32 radius is 41 mm. The pinions 20 and 24 have a 32.5 mm radius. The maximum engine output speed is approximately 6000 rpm. Torque multiplication in drive mode is approximately 0.5 to 8.0:1. Torque multiplication in reverse mode is approximately 1.5 to 6.0:1. Speed multiplication in drive mode is approximately 0.02 to 2.0:1. Speed multiplication in reverse mode is approximately 0.02 to 0.5:1.

The later described transmissions all have a controller 74 as described for the transmission 7.

Figure 2:
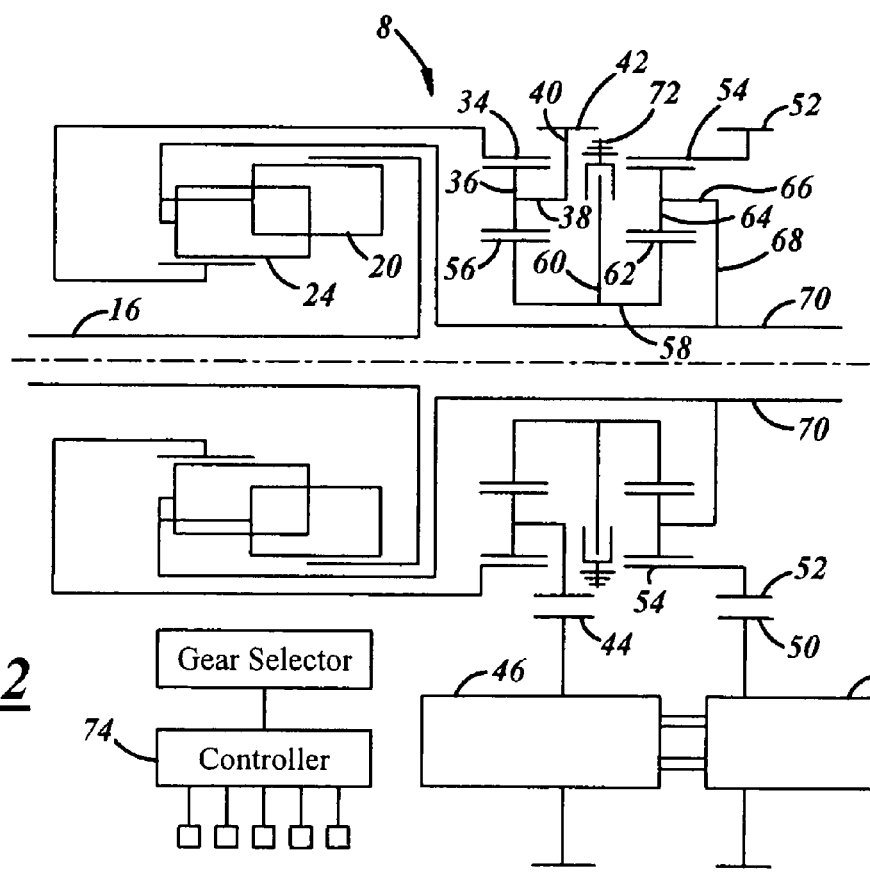
FIG. 2 is a schematic view of an alternate embodiment of the present invention.

Referring to FIG. 2, a transmission 8 is provided which is identical in functioning as the transmission 7 except with a deletion of an input clutch.

Figure 3A:
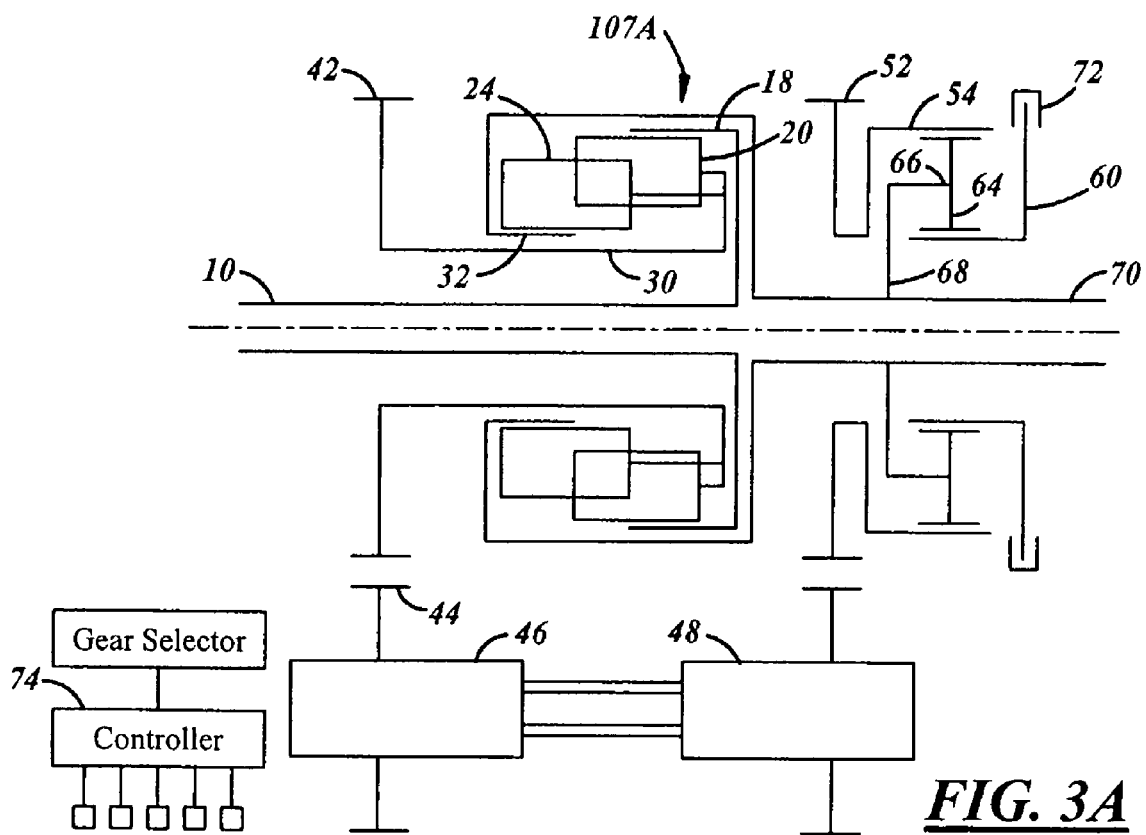
FIG. 3A is a schematic view of an alternate embodiment of the present invention.

Referring to FIG. 3A, transmission 107A provides an alternative preferred embodiment of the present invention wherein the sun gear 32 is connected torsionally with the output shaft 70 instead of the pump 46. The carrier 30 is directly connected (via gear train sprockets 42, 44) with the pump 46. The clutch brake 72 is provided after the motor 48 instead of between the motor 46 and the pump 48.

Figure 3B:
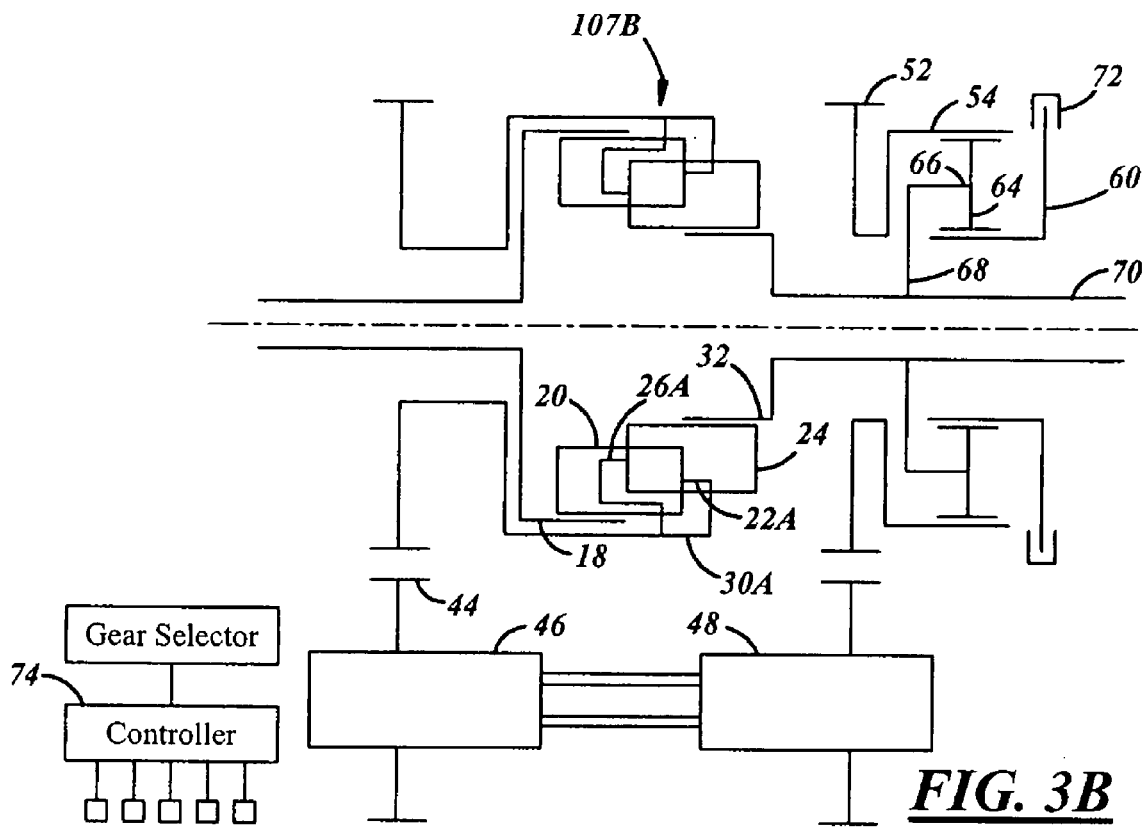
FIG. 3B is a schematic view of an alternate embodiment of the present invention.

Referring to FIG. 3B, transmission 107B schematically illustrates an alternative embodiment of transmission 107A wherein the shafts 22A, 26A of the pinion gears 20 and 24 are extending in opposite directions to one another and the first carrier 30A is shortened in length.

Figure 4:
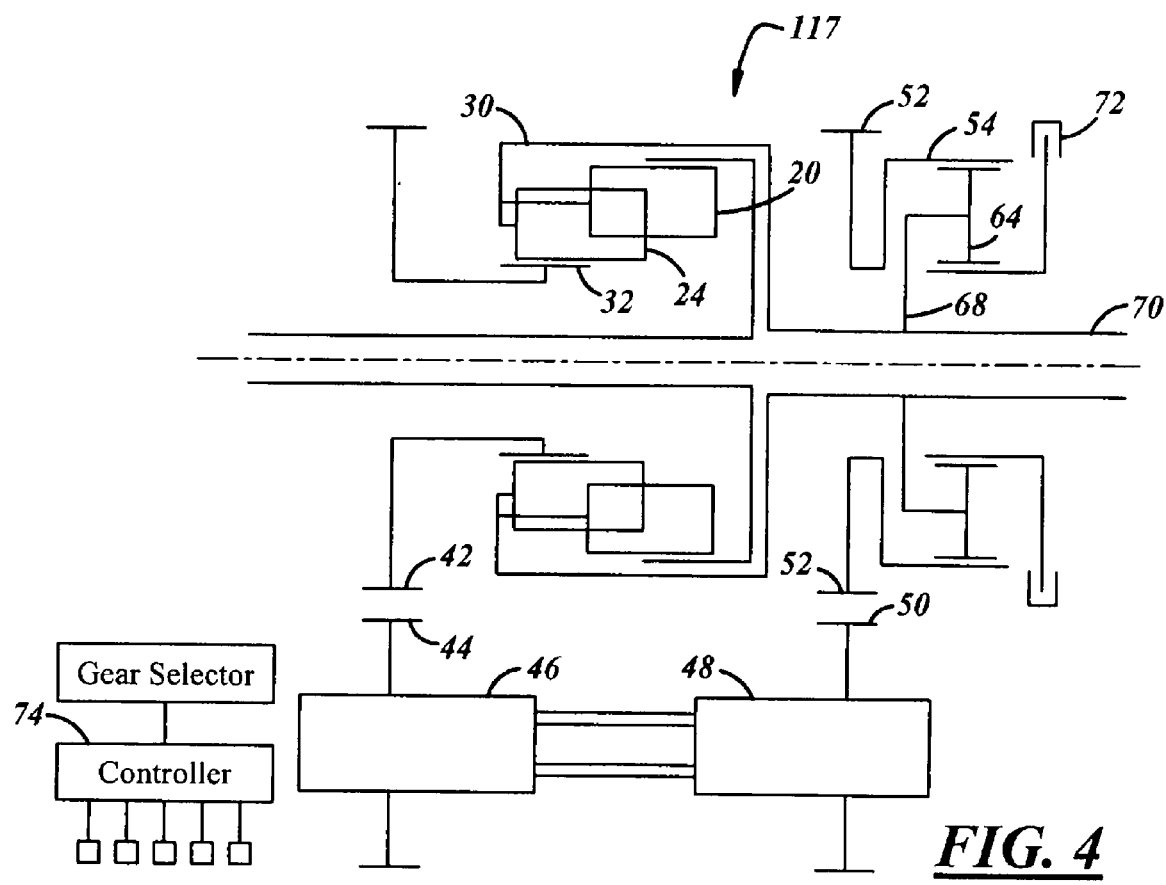
FIG. 4 is a schematic view of an alternate embodiment of the present invention.

Referring to FIG. 4, transmission 117 is similar to the transmission 107 except that the sun gear 32 is connected with the pump 46 instead of the output shaft 70. The first carrier 30 is connected with the output shaft 70 instead of the pump 46.

Figure 5:
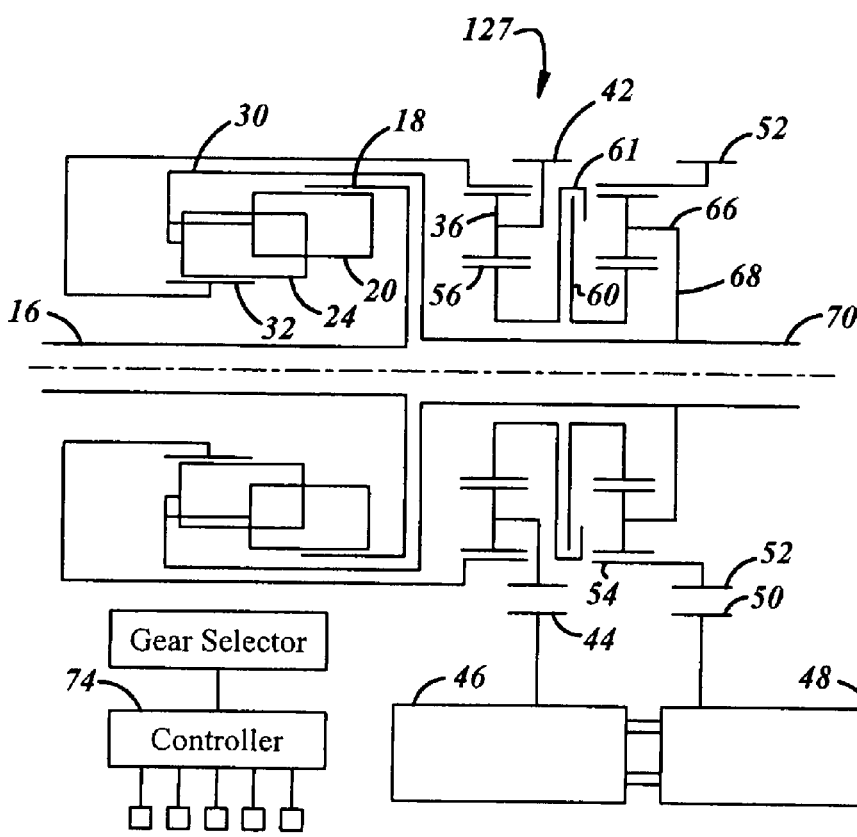
FIG. 5 is a schematic view of an alternate embodiment of the present invention.

Referring to FIG. 5, transmission 127 is similar to transmission 7 except for the omission of clutch 14 and the replacement of the clutch brake 72 with a clutch 61.

Figure 6:
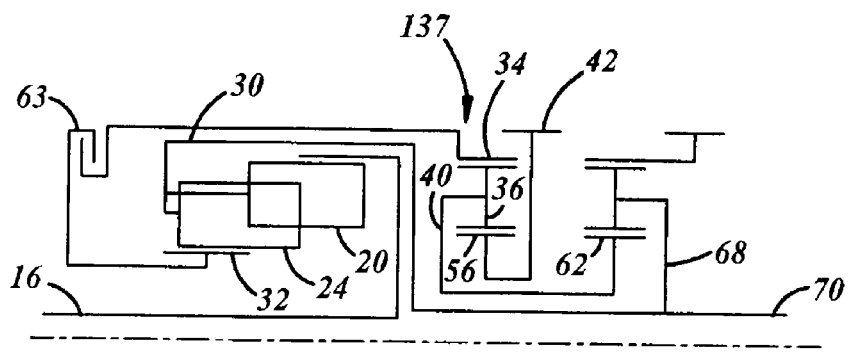
FIG. 6 is a schematic view of an alternate embodiment of the present invention.

Referring to FIG. 6, transmission 137 is similar to transmission 7 except that sun gear 56 drives the pump 46, and carrier 40 is connected to sun gear 62. The clutch brake 72 is also deleted. Additionally the second sun gear 56 is connected directly via the sprocket 42 and 44 with the pump 46. In addition, there is a clutch 63 between the sun gear 32 and the second ring gear 34.

Figure 7:
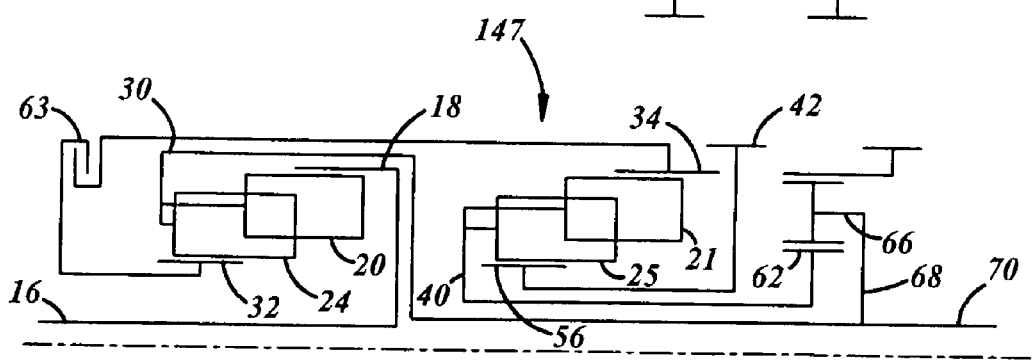
FIG. 7 is a schematic view of an alternate embodiment of the present invention.

Referring to FIG. 7, transmission 147 is similar to transmission 137 with significant changes. The second carrier 40 supports two inter-meshing pinions 21 and 25. The sun gear 32 via the clutch 63 is torsionally connected with the ring gear 34. The second sun gear 56 is connected with the pump 46. The second carrier 40 via the sun gear 62, pinion 64 and carrier 68 is connected with the output shaft 70. In a manner, similar to transmission 137, the first carrier 30 is connected with the output shaft 70.

Referring to FIG. 8, transmission 157 is similar to transmission 147 with the exception that the first carrier 30 only has a single pinion gear set 23. Accordingly the input shaft 16 is connected to the torque distributor of the transmission 157 (carrier 40, and pinions gears 21, 25) via a pre torque distributor planetary gear set (gear 18, carrier 30, pinion 23 and sun gear 32). Additionally the torque distributor is torsionally associated with the output shaft 70 via sun gear 62, pinions 64, and the carrier 68.

Referring to FIG. 9, transmission 167 is similar to transmission 7 but having a smaller diameter sun gear 18A. The sun gear 18A connects the torque distributor to the input shaft 16.

Figure 10:
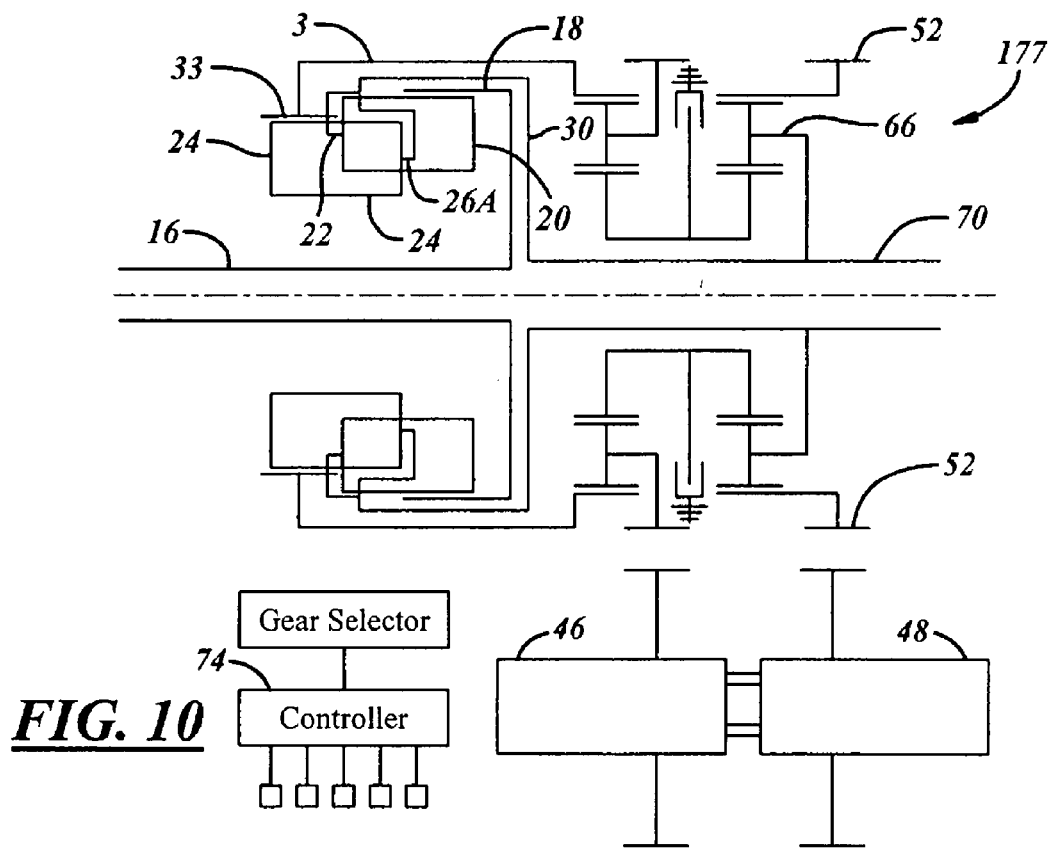
FIG. 10 is a schematic view of an alternate embodiment of the present invention.

Referring to FIG. 10, transmission 177 is similar to transmission 7 but having pinion shafts 22 and 26A extending in opposite directions and wherein the pinions 24 mesh with an inner diameter of a first ring gear 33.

Figure 11:
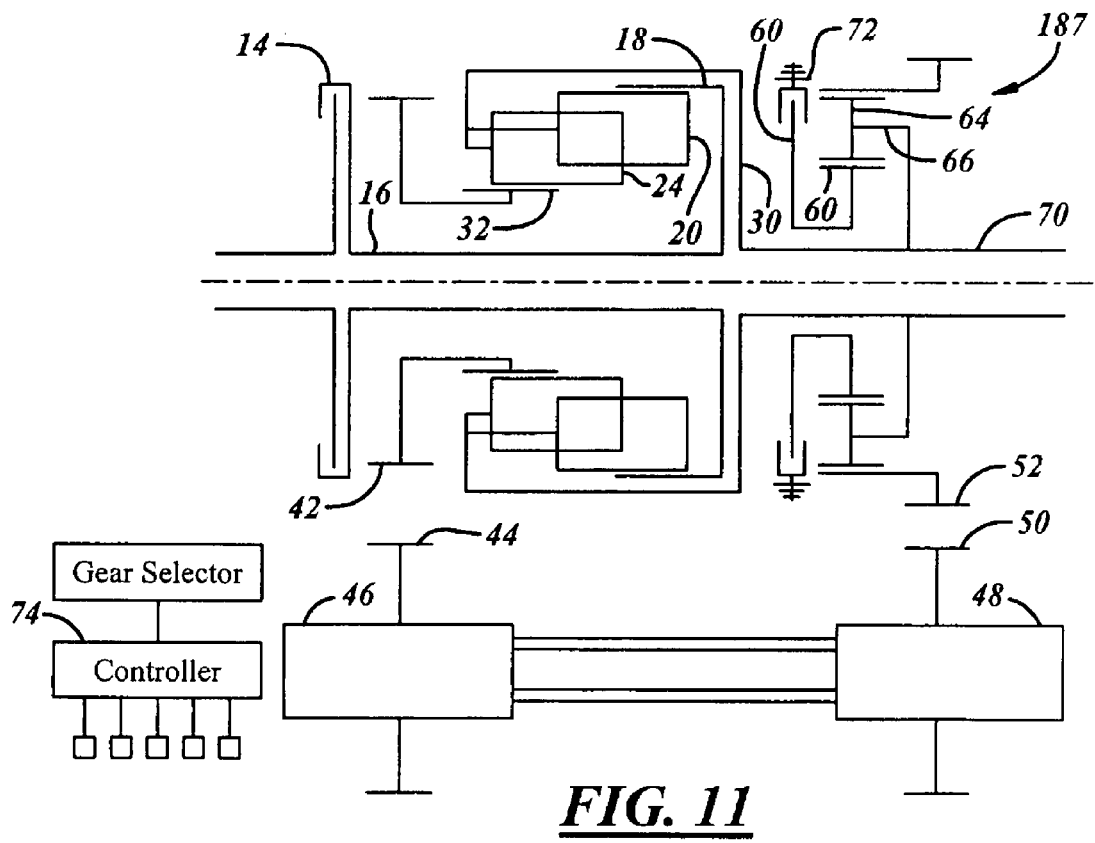
FIG. 11 is a schematic view of an alternate embodiment of the present invention.

Referring to FIG. 11, transmission 187 is similar to transmission 7 except that the sun gear 32 is directly connected (via sprockets) with the pump 46 and the middle sun gear 56 is eliminated.

Figure 12:
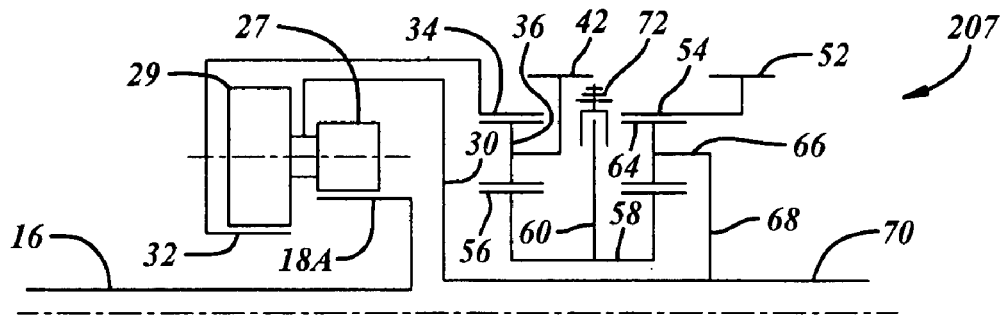
FIG. 12 is a schematic view of an alternate embodiment of the present invention.

Referring to FIG. 12, transmission 207 is similar to transmission 7A with a major change that the first and second pinion gears 27 and 29 rotate about a common axis and are rotatably connected (torsionally fixed) pinion gears. Additionally, the input shaft 16 is connected with an input sun gear 18A.

Figure 13:
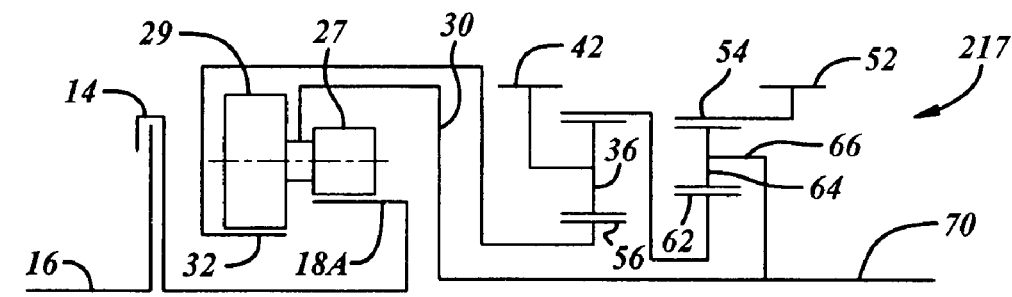
FIG. 13 is a schematic view of an alternate embodiment of the present invention.

Referring to FIG. 13, transmission 217 is similar to transmission 207 being modified by an input clutch 14 and the elimination of the clutch brake 72. Additionally the first sun gear 32 and second sun gear 56 are directly connected together.

Referring to FIG. 14, transmission 227 is similar to transmission to 217 with a modification of the first sun gear 32 being directly connected with the pump 46 (via sprockets). The transmission 227 is similar to the transmission 187 except that the pinion gear sets 29 and 27 of the first carrier 30 are on a common rotational axis.

While preferred embodiments of the present invention have been disclosed, it is to be understood it has been described by way of example only, and various modifications can be made without departing from the spirit and scope of the invention as it is encompassed in the following claims.

The invention claimed is:

1. A continuously variable transmission comprising:
an input shaft;
an input clutch connected with said input shaft;
an intermediate shaft continuously connected with an output of said input clutch;
an input sun gear continuously connected with said intermediate input shaft;
a first pinion gear meshed with said input sun gear;
a second pinion gear continuously connected with said first pinion gear with a larger diameter than said first pinion gear;
a first sun gear meshed with said second pinion gear forward of the first pinion gear;
a variable displacement pump torsionally associated with said first sun gear;
a first carrier supporting said first and second pinion gears in opposite extending directions;
an output shaft continuously connected to said first carrier, said output shaft being coaxial with said input shaft;
a second carrier continuously connected to said output shaft;
a third pinion gear rotatably connected on said second carrier;
a second sun gear meshed with said third pinion gear;
a selectively engagable brake operatively associated with said second sun gear;
a ring gear meshed with said third pinion gear; and
a fluid motor powered by said pump and operatively associated with said ring gear.

* * * * *